United States Patent
Lee et al.

(10) Patent No.: US 9,184,462 B2
(45) Date of Patent: Nov. 10, 2015

(54) FUEL CELL MODULE AND METHOD MANUFACTURING THE SAME

(71) Applicant: Samsung SDI Co., LTD., Yongin-si, Gyeonggi-do (KR)

(72) Inventors: Seung-Tae Lee, Yongin-si (KR); Jan-Dee Kim, Yongin-si (KR); Jun-Won Suh, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 216 days.

(21) Appl. No.: 13/645,321

(22) Filed: Oct. 4, 2012

(65) Prior Publication Data
US 2013/0115545 A1  May 9, 2013

(30) Foreign Application Priority Data
Nov. 7, 2011 (KR) .................... 10-2011-0115157

(51) Int. Cl.
*H01M 8/02* (2006.01)
*H01M 8/12* (2006.01)

(52) U.S. Cl.
CPC .......... *H01M 8/1213* (2013.01); *H01M 8/0202* (2013.01); *Y02E 60/521* (2013.01); *Y02E 60/525* (2013.01); *Y10T 156/10* (2015.01)

(58) Field of Classification Search
CPC .......... H01M 8/00; H01M 8/02; H01M 8/04; H01M 8/0202; H01M 8/1213
USPC .......... 429/508, 507, 458, 466, 468, 495, 479
See application file for complete search history.

(56) References Cited

U.S. PATENT DOCUMENTS

| | | | |
|---|---|---|---|
| 5,348,776 A * | 9/1994 | Ippommatsu et al. | 427/586 |
| 5,397,657 A * | 3/1995 | Ito et al. | 429/479 |
| 6,416,897 B1 | 7/2002 | Tomlins et al. | |
| 8,142,940 B2 * | 3/2012 | Poirot-Crouvezier et al. | 429/415 |
| 8,334,079 B2 * | 12/2012 | Strutt et al. | 429/489 |
| 8,343,686 B2 * | 1/2013 | DeJonghe et al. | 429/497 |
| 8,435,692 B2 * | 5/2013 | Shibata et al. | 429/454 |
| 8,530,112 B2 * | 9/2013 | Uchiyama et al. | 429/508 |
| 8,652,707 B2 * | 2/2014 | Finnerty et al. | 429/497 |
| 2003/0082434 A1 | 5/2003 | Wang et al. | |
| 2004/0219411 A1 | 11/2004 | Yamashita et al. | |
| 2005/0037252 A1 * | 2/2005 | Pham | 429/31 |
| 2005/0058883 A1 | 3/2005 | Ruka et al. | |
| 2011/0053032 A1 * | 3/2011 | Gil et al. | 429/458 |
| 2011/0195336 A1 | 8/2011 | Kabumoto et al. | |

FOREIGN PATENT DOCUMENTS

| | | |
|---|---|---|
| KR | 100738308 B1 | 7/2007 |
| WO | 02/21621 A2 | 3/2002 |

* cited by examiner

*Primary Examiner* — Kenneth Douyette
(74) *Attorney, Agent, or Firm* — Robert E. Bushnell, Esq.

(57) ABSTRACT

A fuel cell module and a method manufacturing the same that improves a contact structure of the inter-connectors to prevent gas leaks, thereby to improving the performance and the durability of the unit cell. The fuel cell module includes a plurality of inter-connectors, wherein at least one of the inter-connectors has a first face contacting a first electrode layer, a second face opposing the first face, and third and fourth faces connecting the first face to the second face, respectively, wherein at least a portion of the at least one of the inter-connectors also contacts an electrolytic layer, wherein a length of the first face of the at least one of the inter-connectors is 20% to 80% of a length of the second face.

9 Claims, 6 Drawing Sheets

FUEL CELL MODULE AND METHOD MANUFACTURING THE SAME

CLAIM OF PRIORITY

This application makes reference to, incorporates the same herein, and claims all benefits accruing under 35 U.S.C. §119 from an application for FUEL CELL MODULE AND METHOD MANUFACTURING THE SAME earlier filed in the Korean Intellectual Property Office on Nov. 7, 2011 and there duly assigned Serial No. 10-2011-0115157.

BACKGROUND OF THE INVENTION

1. Field of the Invention

The present invention relates to a fuel cell module and a method manufacturing the same, more particularly, to the fuel cell module and the method manufacturing the same having inter-connectors with an improved structure to prevent occurrence of leakage.

2. Description of the Related Art

The fuel cell, which is a clean power generation technology, uses oxygen from the air and hydrogen as reactants to produce electrical energy by an electrochemical reaction, the hydrogen either being directly supplied or being reformed from a hydrocarbon fuel such as natural gas, coal gas, and methane. The fuel cell may be classified into alkali type, phosphoric acid type, molten carbonate, solid oxide and polymer fuel according to the type of electrolyte used.

Out of these, a solid oxide fuel cell, which is a fuel cell operating at high temperature of about 600-1000° C., has several advantages in that as compared to other types of the fuel cells in the related art, has efficiency higher, less pollution and it is possible to perform complex power generation without requiring a fuel reformer.

In the solid oxide fuel cell, the inter-connectors are arranged between each of the cells to connect each of the cells together, and collect electricity produced by the cells. Further, the inter-connectors mechanically support the cell, and are responsible for separating and transporting reaction gases to the anode and the cathode.

The inter-connectors have high adhesion strength on a support having porous structure, while having low adhesion strength on an electrolytic layer having a dense structure. Accordingly, the leakage of the reaction gas frequently occurs in the fuel cell where the inter-connectors are simply coated on the electrolytic layer, and there is problem in that performance and durability of the fuel cell are lowered due to the leakage.

SUMMARY OF THE INVENTION

An advantage of some aspects of the present invention is that it provides a fuel cell module and a method manufacturing the same having the inter-connectors with improved structure to prevent the occurrence of leakage.

Another advantage of some aspects of the present invention is that it provides a fuel cell module and a method manufacturing the same capable of improving the performance and the durability by providing the unit cell in which the leakage of reactants do not occur.

According to one aspect of the invention, there is provided a fuel cell module that includes a first electrode layer, an electrolytic layer arranged on the first electrode layer, a second electrode layer arranged on the electrolytic layer and a plurality of inter-connectors, wherein at least one of the inter-connectors has a first face contacting the first electrode layer, a second face opposing the first face, and third and fourth faces connecting the first face to the second face, respectively, wherein at least a portion of the at least one of the inter-connectors also contacts the electrolytic layer, wherein a length of the first face of the at least one of the inter-connectors is 20% to 80% of a length of the second face.

The first face of the at least one of the inter-connectors may contact a surface of the first electrode layer. The third and fourth faces have a stepped structure. The third and fourth faces may have curved surfaces. The third and fourth faces may have inclined flat surfaces.

The at least one of the inter-connectors may extend into the first electrode layer and a portion of the third and fourth faces may be in contact with the first electrode layer. The third and fourth faces have a stepped structure. The third and fourth faces may have curved surfaces. The third and fourth faces may have inclined flat surfaces.

According to another aspect of the present invention, there is provided a method of manufacturing a fuel cell module, including providing a first electrode layer, laminating an electrolytic layer onto the first electrode layer, laminating a second electrode layer onto the electrolytic layer and attaching a plurality of inter-connectors so that at least one of the inter-connectors has a first face contacting the first electrode layer, a second face opposing the first face, and third and fourth faces connecting the first face to the second face, respectively, wherein a length of the first face is 20% to 80% of a length of the second face, wherein a portion of the at least one of inter-connector also contacts the electrolytic layer.

The method may also include forming a cavity for the first inter-connector by etching the electrolytic layer to expose a surface of the first electrode layer prior to the attaching of the at least one of the inter-connectors. The electrolytic layer may be etched by a sandblasting technique. A mask may be used to etch the electrolytic layer. In the etching of the electrolytic layer, sidewalls of the cavity corresponding to the third and fourth faces of the at least one of the inter-connectors may have a stepped structure produced by two separate etching processes. In the etching of the electrolytic layer, portions of the sidewalls of the cavity that correspond to the third and fourth faces of the at least one of the inter-connectors may have curved surfaces.

The method may instead include forming a cavity by etching through the electrolytic layer and into the first electrode layer prior to attaching the at least one of the inter-connectors. The etching may include a sandblasting technique. A mask may be used during the etching of the cavity. In the etching of the cavity, sidewalls of the cavity corresponding to the third and fourth faces of the at least one of the inter-connectors may have a stepped structure produced by two separate etching processes. In the etching, portions of the sidewalls of the cavity that correspond to the third and fourth faces of the at least one of the inter-connectors may have curved surfaces.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

The present invention may have various embodiments with various transformations, and the detailed description will be described with reference to the drawings showing specific embodiments. However, the present invention is not defined by or limited to the specific embodiments by the detailed description, and should be understood to include all transformations, equivalents or substitutes to be included in ideas and technical range of the present invention. In the description of the present invention, when the detailed description for the known technology in the related art may blur the gist of the present invention, the detailed description will be omitted.

Although terminologies such as first, second and the like may be used to describe various constituents, the constituents should not be limited by the terminologies. The terminologies are used to distinguish a constituent from another constituent.

The terminologies used in this application is only used to describe the specific embodiment, and do not limit the present invention. The expression of the singular includes multiple expressions unless it clearly means differently in context. Hereinafter, the embodiment of the present invention will be described in detail with reference to the attached drawings.

Figure 1:
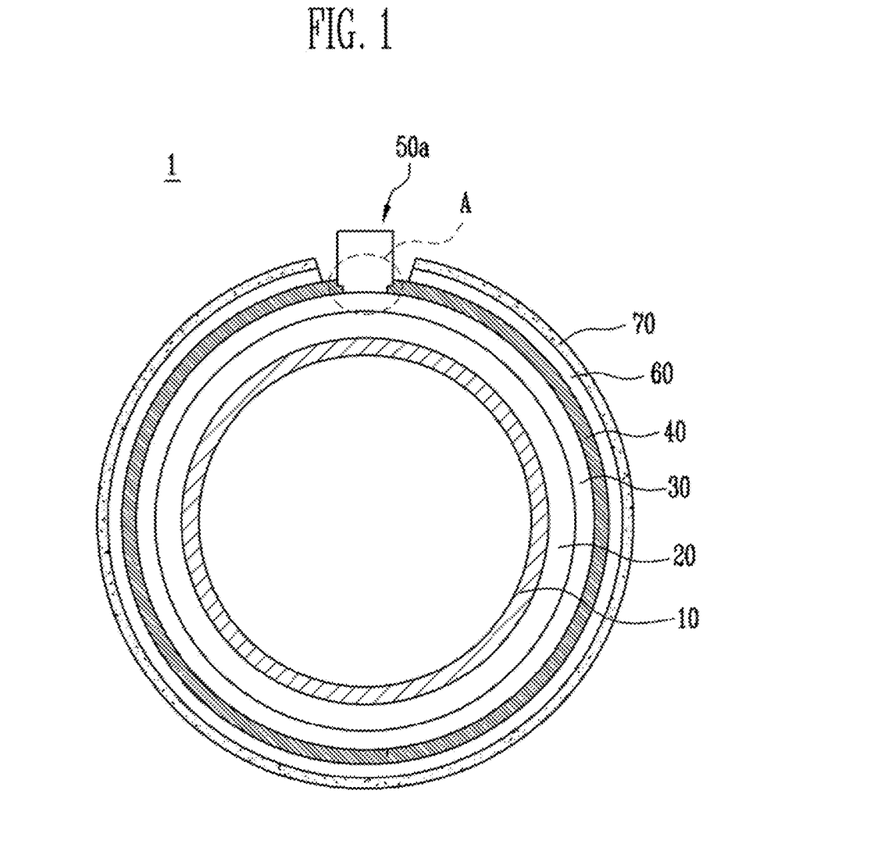
FIG. 1 is a sectional view of thickness direction schematically showing a unit cell structure of a solid oxide fuel cell (SOFC) module according to a first embodiment of the present invention.
Figure 2A:
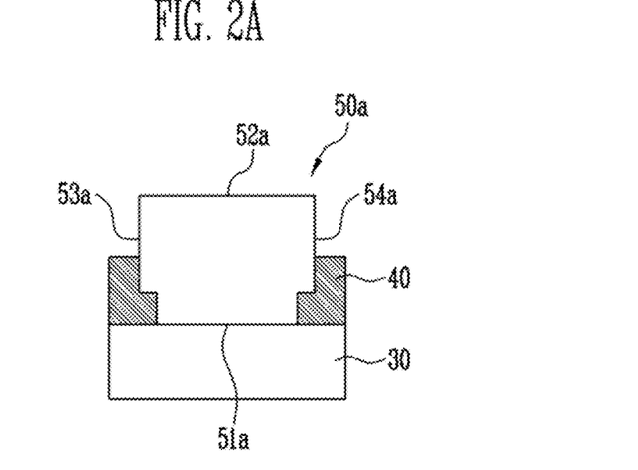
FIG. 2A is an enlarged view of portion A of FIG. 1 showing an enlarged view of an inter-connector structure according to a first embodiment of the present invention.

FIG. 1 is a sectional view of thickness direction schematically showing a unit cell structure of a solid oxide fuel cell (SOFC) module according to a first embodiment of the present invention, FIG. 2A is an enlarged view of portion A of FIG. 1 showing the structure of an inter-connector according to a first embodiments of the present invention and FIG. 2B to 2F are enlarged views for the structure of inter-connectors according to second to sixth embodiments of the present invention.

Referring now to FIGS. 1 and 2A, a solid oxide fuel cell module according to the first embodiment of the present invention is gradually laminated with a first electrode layer 30 of a cylindrical type, an electrolytic layer 40 and a second electrode layer 60, and provides a unit cell 1 including inter-connectors 50a in contact with at least a portion of the first electrode layer 30 and the electrolytic layer 40.

Here, the inter-connector 50a includes a first face 51a contacting a first electrode layer 30, a second face 52a opposing the first face 51a, and a third face 53a and a fourth face 54a connecting the first face 51a to the second face 52a, respectively, where a length of the first face 51a is 20% to 80% of the entire length of the second face 52a. When the length of the first face 51a is below 20% of the entire length of the second face 52a, resistance of the first face 51a is abruptly increased as compared to the second face 52a and results in current loss. Therefore, it may collect while minimizing the current loss when at least 20% or more. When considering the current loss only, as the length of the first face 51a approaches 100% of the entire length of the second face 52a, current loss is not a problem. However, when the length of the first face 51a approaches becoming 90% of a length of the second face 52a, the contact between the first face 51a and the electrolytic layer 40 is diminished, resulting in reactant gas leakage. Further, when manufacturing to have the length from 80% to 100% in current process level, there are difficulties that may be not controlled.

For example, when the first electrode layer 30 becomes an anode and the second electrode layer 60 becomes a cathode, the unit cell 1 produces electricity by electrochemically reacting hydrogen supplied to the anode or first electrode layer 30 and oxygen supplied to the cathode or second electrode layer 60.

Further, the first electrode collector 20 is formed on the inner periphery of the first electrode layer 30, and the second electrode collector 70 is formed on the outer periphery of the second electrode layer 60, such that the electricity produced by the unit cell 1 can be supplied to external devices or circuits through the first electrode collector 20 and the second electrode collector 70.

At this moment, the second electrode collector 70 is generally of a wire type wound in a spiral on the outer periphery of the second electrode layer 60.

Further, various configurations of metal, such as wire, a stick, a metal pipe and a tube, may be inserted into the first electrode collector 20 on the inner periphery of the first electrode layer 30. As shown in FIG. 1, it is possible to adhere the first electrode collector 20 to the inner periphery of the first electrode layer 30 by including a metal tube 10 and the like on an inside the first electrode layer 30. The various configurations of metal, such as the wire, the stick, the pipe and the tube, may be inserted, thereby allowing the first electrode layer 30 to collect and improve the strength of the fuel cell. Further, a separate metal tube 10 and the like are inserted inside the first electrode collector 20, thereby furthering adhering the first electrode collector 20 to the first electrode layer 30, and simultaneously improving the strength.

The first face 51a of the inter-connectors 50a according to the first embodiment of the present invention contacts the face of the first electrode layer 30, and the third and fourth faces 53a and 54a of inter-connectors 50a each have a stepped structure. The stepped structure of the third and fourth faces 53a and 54a contacts the electrolytic layer 40.

In addition, the inter-connectors 50a are away from the outer periphery thereof and protrude from the outside of the unit cell without contacting either the second electrode layer 60 or the second electrode collector 70. Therefore, in the second electrode layer 60 and the second electrode collector 70, a portion of their cylindrical outer periphery is removed.

The inter-connectors 50a have strong adhesion strength to the first electrode layer 30 as the first electrode layer 30 serves as a porous support, but the inter-connectors 50a have low adhesion strength to the electrolytic layer 40 as the electrolytic layer 40 has an even and dense structure. If a step is formed in the third and fourth faces 53a and 54a that are bonded to the electrolytic layer 40 according to the first embodiment of the present invention, a roughness is increased on the surface of electrolytic layer 40, and a contact area is increased, thereby serving to increase the adhesion strength between the electrolytic layer 40 and the inter-connectors 50a. Accordingly, the occurrence of leakage of hydrogen gas or fuel gas between the inter-connectors 50a and the electrolytic layer 40 may be prevented. Further, the lowering of conductivity for the inter-connectors 50a is avoided, thereby improving performance and durability of the unit cell 1.

Figure 2B:
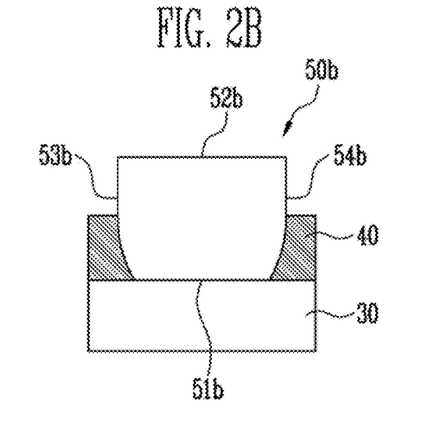
FIGS. 2B to 2F are enlarged views of inter-connector structures according to second to sixth embodiments of the present invention.

Turning now to FIG. 2B, the inter-connectors 50b according to a second embodiment of the present invention include a first face 51b contacting a first electrode layer 30, a second face 52b opposing the first face 51b, and third and fourth faces 53a and 54a connecting the first face 51b to the second face 52b, respectively, a length of the first face 51b being 20% to 80% of an entire length of the second face 52b.

The first face 51b of the inter-connectors 50b according to the second embodiment of the present invention contacts the surface of the first electrode layer 30, and the third and fourth faces 53a and 54a of the inter-connectors 50b have an a bowed or curved surface. The bowed or curved surface of the third and fourth faces 53a and 54a contacts the electrolytic layer 40.

As with the inter-connectors 50a according to the first embodiment, the inter-connectors 50b according to the second embodiment of the present invention result in increased roughness of the sidewall surface of the electrolytic layer 40 along with increased contact area, thereby serving to increase the adhesion strength between the electrolytic layer 40 and the inter-connectors 50b. Accordingly, the occurrence of the leakage of hydrogen gas or reaction gas between the inter-connectors 50b and the electrolytic layer 40 may be prevented. Further, the lowering of conductivity for the inter-connectors 50b is avoided, thereby improving performance and durability of the unit cell 1.

Figure 2C:
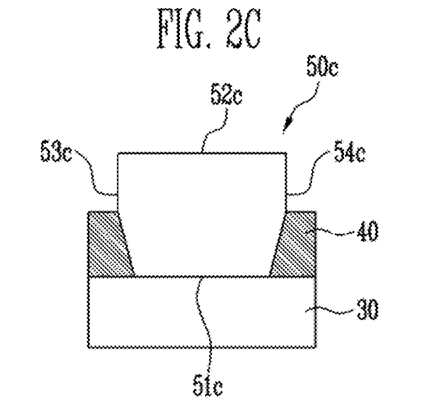

Turning now to FIG. 2C, the inter-connectors 50c according to a third embodiment of the present invention includes a first face 51c contacting a first electrode layer 30, a second face 52c opposing the first face 51c, and third and fourth faces 53c and 54c connecting the first face 51c to the second face 52c, respectively, a length of the first face 51c being 20% to 80% of an entire length of the second face 52c.

The first face 51c of the inter-connectors 50c according to the third embodiment of the present invention contacts the surface of the first electrode layer 30, and the third and fourth faces 53c and 54c of the inter-connectors 50c have an inclined or slanted flat surface. The inclined surfaces of the third and fourth faces 53c and 54c contacts the electrolytic layer 40.

As with the inter-connectors 50b of the second embodiment, the inter-connectors 50c according to the third embodiment of the present invention provides a design for the third and fourth faces 53c and 54c that increases the roughness of the surface of the electrolytic layer 40 and the contact area with the electrolytic layer, thereby to increase the adhesion strength between the electrolytic layer 40 and the inter-connectors 50c. Accordingly, the occurrence of a leakage of hydrogen gas or other reactant gas between the inter-connectors 50c and the electrolytic layer 40 may be prevented. Further, the lowering of conductivity of the inter-connectors 50c is avoided, thereby improving performance and durability of the unit cell 1.

Figure 2D:
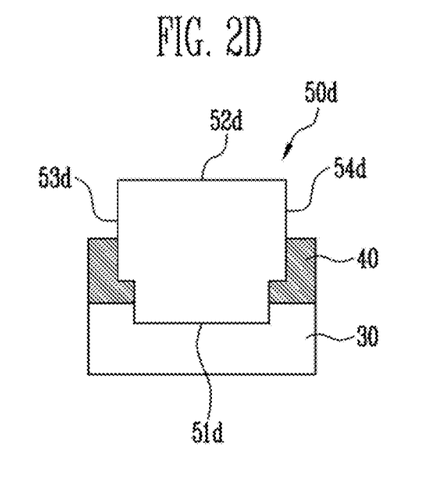
Figure 2E:
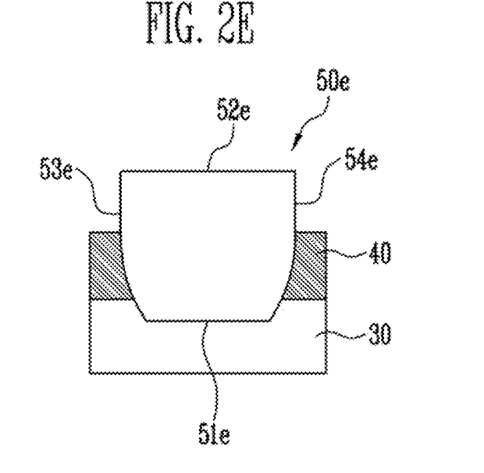
Figure 2F:
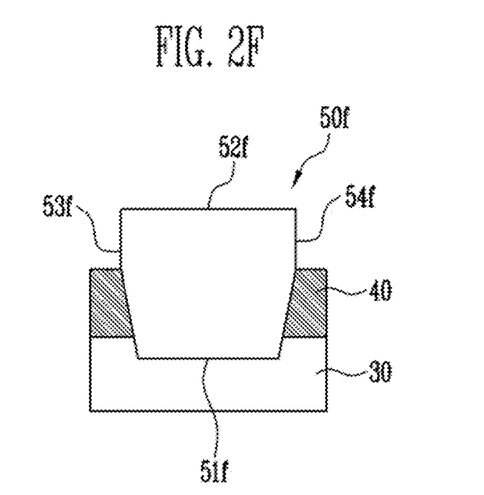

The fourth through sixth embodiments of FIGS. 2D to 2F are modifications to the first to third embodiments of FIGS. 2A to 2C respectively. In the embodiments of FIGS. 2D to 2F, the inter-connectors 50d to 50f extend into the first electrode layer 30 so that a portion of the third and fourth faces 53d, 54d, 53e, 54e, 53f and 54f are in contact with the first electrode layer 30. This results in greater contact area with the first electrode layer 30 and greater adhesion between the third and fourth faces 53d, 54d, 53e, 54e, 53f and 54f and the corresponding sidewall surfaces of the cavities.

Because the modification made between the embodiments of FIGS. 2A to 2C and FIGS. 2D to 2F, respectively is similar in all three instances, only the sixth embodiment of FIG. 2F will now be described in detail.

Turning now to FIG. 2F, the inter-connectors 50f according to a sixth embodiment of the present invention includes a first face 51f contacting a first electrode layer 30, a second face 52f opposing the first face 51f, and third and fourth faces 53f and 54f connecting the first face 51f to the second face 52f, respectively, a length of the first face 51f being 20% to 80% of an entire length of the second face 52f.

The first face 51f of the inter-connectors 50f according to the sixth embodiment of the present invention contacts an interior of the first electrode layer 30 so that a portion of the third and fourth faces 53f and 54f of the inter-connectors 50f are in contact with the first electrode layer 30. As a result, portion of the third and fourth faces 53f and 54f and the entire first face 51f of inter-connector 50f contacts the first electrode layer 30.

Unlike the first to third embodiment, the inter-connectors 50f according to the sixth embodiment of the present invention have high adhesion strength because the entire first face 51f and portions of the third and fourth faces 53f and 54f contact the porous first electrode layer 30. Accordingly, the occurrence of a leak of hydrogen gas or reaction gas via third and fourth faces 53f and 54f may further be prevented. Also, the lowering of conductivity for inter-connector 50f may be avoided, thereby improving performance and durability of the unit cell 1.

Although the sixth embodiment of the present invention describes the case that the third and fourth faces 53c and 54c of the third embodiment of FIG. 2C extend into the first electrode layer 30 as third and fourth faces 53f and 54f, this modification of extending the inter-connectors into the first electrode layer 30 is not limited to the embodiment of FIG. 2C. For example, the third and fourth faces 53a and 54a of inter-connector 50a of FIG. 2A can be extended into the first electrode layer 30 as in FIG. 2D, or the third and fourth faces 53b and 54b of inter-connector 50b of FIG. 2B can be extended into the first electrode layer 30 as in FIG. 2E, and still be within the scope of the present invention. As with inter-connector 50f, in each of the inter-connector structures 50d and 50e of FIGS. 2D and 2E, by extending the inter-connector into the first electrode layer 30, a greater surface area contact with the first electrode layer 30 is achieved, and leak prevention is further enhanced between the third and fourth faces 53d, 54d, 53e and 54e as a portion of these faces face the porous first electrode layer 30.

Figure 3A:
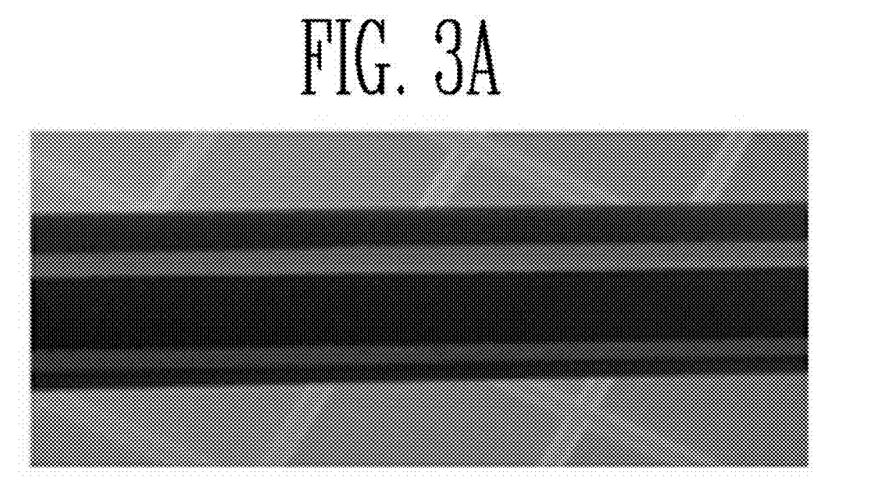
FIGS. 3A and 3B are pictures showing leakage test results of a unit cell according to a comparative example and a unit cell according to the first embodiment of the present invention.
Figure 3B:
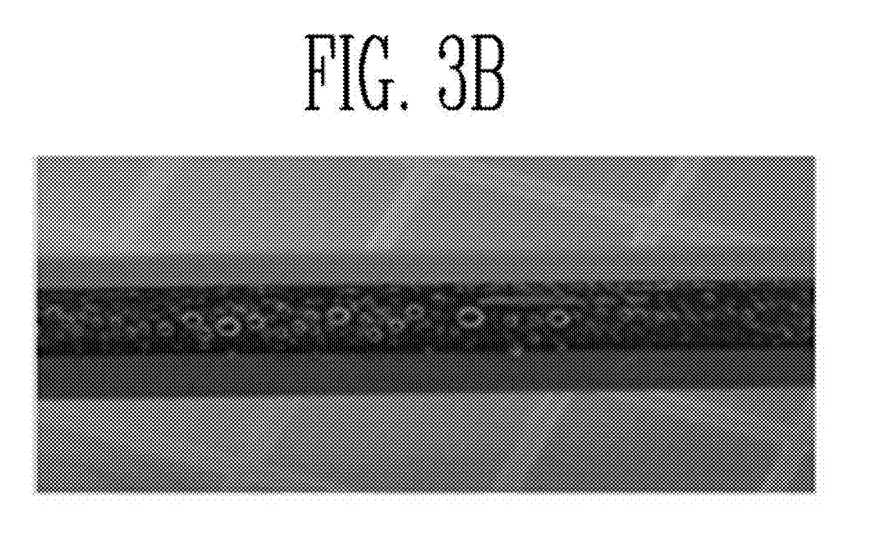

Hereinafter, the leakage test result of a comparative example and an embodiment of the present invention will be described with reference to Table 1, FIG. 3A and FIG. 3B.

<Embodiment>

In the embodiment of the present invention, for example, the anode-supported type will be described.

The first electrode layer 30, made out of a metal of the wire type for the first electrode collector 20 on the inner periphery thereof, is formed on the metal tube 10. At this moment, the first electrode layer 30 is fowled by mixing yttria-stabilized zirconia(YSZ) powder, organic binder and a solvent, manufacturing a predetermined paste, and heating the manufactured paste to 1000~1300° C.

Next, the surface of the first electrode 30 is coated by mixing oxide powder doped with the rare earth elements, that is, $Y_2O_3$—$ZrO_2$, the organic binder and the solvent, and using the manufactured paste or slurry, and is heated to 1300~1600° C. Then, the electrolytic layer 40 is formed on the first electrode layer 30.

Then, the electrolytic layer 40 undergoes a first etching process to expose the surface of the first electrode layer 30 by sand blasting, and then undergoes a second etching process to form each of the stepped structure, the flat inclined structure and the curved structure facing the electrolytic layer 40.

At this moment, when considering sizes of the inter-connectors 50a, 50b, 50c, and 50f to be formed later, the length of the first electrode layer 30 to be exposed during first etching process becomes 80% of the length of the second faces 52a, 52b, 52c, 52f of final inter-connectors 50a, 50b, 50c, 50f. Further, even during second-etching, when considering the sizes of the second faces 52a, 52b, 52c, 52f of the inter-connectors 50a, 50b, 50c, 50f, an etching degree of the electrolytic layer 40 is controlled. The electrolytic layer 40 is etched using a mask to ensure the accuracy of the first and second etching processes.

Next, the inside of the electrolytic layer 40 formed with the stepped structure, the curved type structure or the flat inclined structure, the second electrode layer 60, the inter-connectors 50a, 50b, 50c, 50f to be protruded from the outside of the unit cell 1 while not contacting the second electrode layer 60 and the second electrode collector 70 that are formed later, are formed.

Hereinafter, the second electrode layer 60, formed with the metal material of the wire type for the second electrode collector 70 on the outer periphery thereof, is formed on the electrolytic layer 40 without contacting the inter-connectors 50a, 50b, 50c, 50f and therefore, the fuel cell unit cell 1 is completed according to the embodiment of the present invention. At this moment, the second electrode layer 60, that has high ion conductance, electronic conductance and is stable at oxidizing atmosphere, is formed by mixing $LaSrMnO_3$ powder, organic binder and a solvent that will not chemically react with the electrolytic layer 40, manufacturing the predetermined paste, and heating the manufactured paste to 1000~1300° C.

The leakage test is performed by application of various pressures (kPa) to the completed unit cell 1, the results being listed in Table 1 below, FIG. 3A and FIG. 3B As listed in Table 1, regardless of magnitude of the pressure applied to the unit cell 1, the leak of gas between the inter-connectors 50a, 50b, 50c, 50f and the electrolytic layer 40 in the first, second, third and sixth embodiment did not occur. Referring to FIG. 3A, bubbles due to the occurrence of a leak are not present in the pictures taken when performing the leak test for the unit cell 1 according to the first embodiment.

[comparative example]

A comparative example is the same content as the Embodiment, except that the third face 53a, 53b, 53c, 53f and the fourth face 54a, 54b, 54c, 54f are flat, not inclined straight line structures, as compared with the first to third embodiment. Like the Embodiment, the leak test is performed by applying pressure (kPa) to the unit cell of the completed comparative example, the results are listed in Table 1 below and illustrated in FIG. 3B.

As listed in Table 1, the leakage of gas was visible and occurred between the inter-connectors and the electrolytic layer regardless of the magnitude of pressure (kPa) applied to the unit cell of the comparative example. Referring to FIG. 3B, bubbles due to the occurrence of the leak can be observed for the unit cell of the comparative example.

TABLE 1

| Applied pressure (kPa) per unit cell | first embodiment | second embodiment | third embodiment | sixth embodiment | comparative example |
|---|---|---|---|---|---|
| | Did a leak occur? (o: occurrence of a leak, x: no occurrence of a leak) | | | | |
| 10 | x | x | x | x | o |
| 20 | x | x | x | x | o |
| 30 | x | x | x | x | o |
| 40 | x | x | x | x | o |
| 50 | x | x | x | x | o |
| 60 | x | x | x | x | o |
| 70 | x | x | x | x | o |
| 80 | x | x | x | x | o |

Hereinafter, the bonding test result of the inter-connectors according to the degree of contact between the inter-connectors and electrolytic layer in the first embodiment of the present invention will be described with reference to FIGS. 4A and 4B.

Figure 4A:
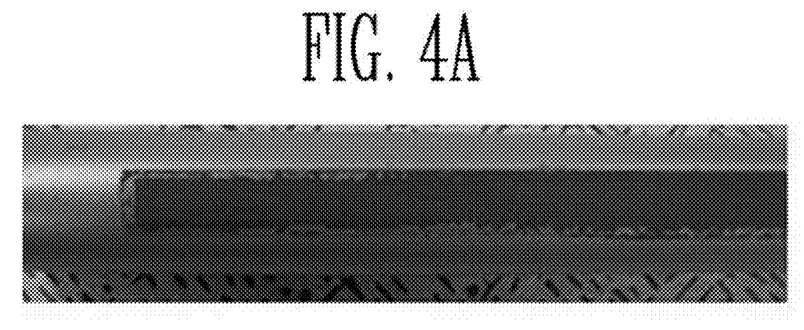
FIGS. 4A and 4B are the pictures showing adhesion test results of the inter-connectors according to a degree of contact between the inter-connectors and the electrolytic layer in the first embodiment of the present invention.
Figure 4B:
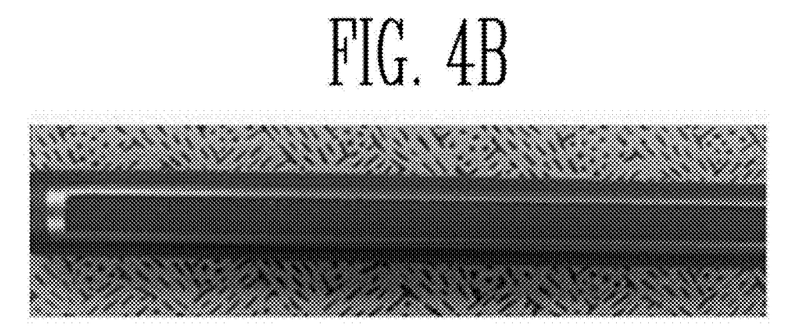

FIG. 4A is a picture of the unit cell 1 when the length of the first surface 51a is 90% of the entire length of the second face 52a, and FIG. 4B is a picture of the unit cell 1 when the length of the first surface 51a is 80% of the entire length of the second face 52a.

When the length of the first face 51a of FIG. 4A is 90% of the entire length of the second face 52a, that is, when the step is small inside the electrolytic layer 40 and therefore, the contact area is minimal, the bonding force between the inter-connectors 50a and the electrolytic layer 40 is reduced, so that a portion of the inter-connectors 50a becomes delaminated.

In contrast, when the length of the first face 51a of FIG. 4B is 80% of the entire length of the second face 52a, that is, when the step is larger inside the electrolytic layer 40 and therefore, the contact area is greater, the bonding force between the inter-connectors 50a and the electrolytic layer 40 is increased, so that the inter-connectors 50a do not delaminate.

Figure 5:
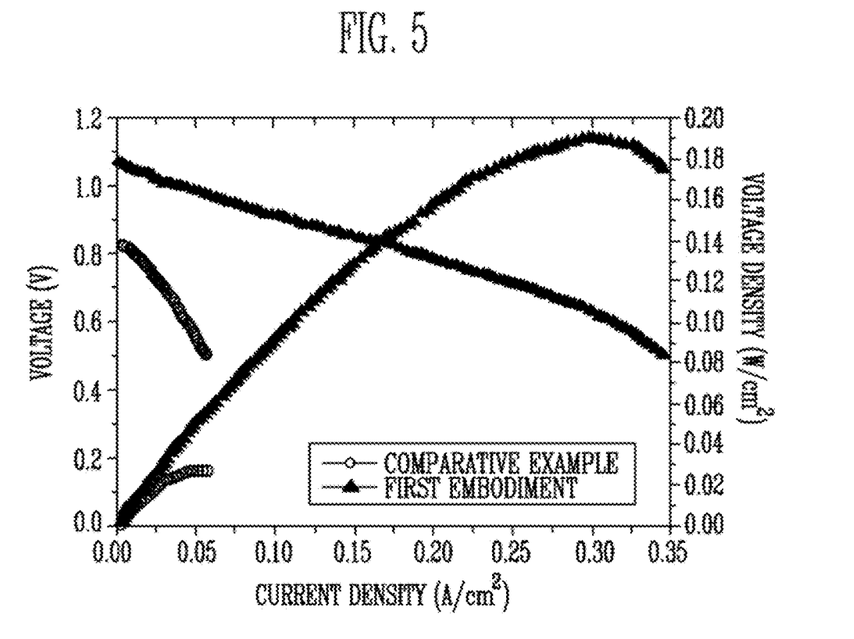
FIG. 5 is a performance graph of the solid oxide fuel cell unit cell having the inter-connectors according to the comparative example and the first embodiment of the present invention.

FIG. 5 is a performance graph of the solid oxide fuel cell unit cell using the inter-connectors according to the comparative example and according to the first embodiment of the present invention.

In the comparative example, since the leakage occurs due to the lowering of the bonding force between the inter-connectors and the electrolytic layer, initial open-circuit voltage (OCV) is too low, that is, 0.84V, and sudden voltage drop had been shown according to the current that is applied. Further, when the lowest value of voltage is 0.5V, it has too of a low current density of about 0.057 Å/cm². At this moment, the maximum current was 4.9 Å. The maximum power density is too low, that is, about 0.029 W/cm² and the maximum power is also about 2.47 W. In the above, when the length of the unit cell was 50 cm, it is expected that the power of about 6.32 W per unit cell is generated.

In contrast, in the first embodiment, the bonding force between the inter-connectors 50a and the electrolytic layer 40 is increased, therefore, the initial open-circuit voltage is relatively high, that is, 1.077V, and voltage drop was small according to the current to be applied. Further, when the lowest value of the voltage is 0.5V, it has too high of a current density of about 0.347 Å/cm². At this moment, the maximum current was 29.8 Å. The maximum power density is too high, that is, about 0.174 W/cm², and the maximum power is also high, that is, about 16.33 W. In the above, when the length of the unit cell was 50 cm, it is expected that the power of about 41.8 W per unit cell is generated, such that significant performance difference of about 6.6 times is expected as compared with the comparative example.

In the present invention, the fuel cell module and the method manufacturing the same having the inter-connectors with improved structure is provided to prevent the occurrence of a leak. Further, the performance and the durability of the unit cell may be improved by improving the contact structure of the inter-connector. In the present invention, the fuel cell module and the method manufacturing the same having the inter-connectors having the improved structures are provided to prevent occurrence of the leakage. Further, the performance and the durability of the unit cell may be improved by improving the contact structure of the inter-connector.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A fuel cell module, comprising:
a first electrode layer;
an electrolytic layer arranged on the first electrode layer;
a second electrode layer arranged on the electrolytic layer; and
a plurality of inter-connectors,
wherein at least one of the inter-connectors has a first face contacting the first electrode layer, a second face opposing the first face, and third and fourth faces connecting the first face to the second face, respectively,
each of the third and fourth faces includes a first portion directly contacting at least one of the first electrode layer and the electrolytic layer and a second portion extending from the first portion, and
the second portion extends in a substantially vertical direction to the first face, and
wherein a length of the first face of the at least one of the inter-connectors is 20% to 80% of a length of the second face, each of said plurality of inter-connectors has a single continuous structure.

2. The fuel cell module of claim 1, wherein the first face of the at least one of the inter-connectors contacts a surface of the first electrode layer.

3. The fuel cell module of claim 1, wherein the at least one of the inter-connectors extends into the first electrode layer and an entirety of the first face contacts an inside of the first electrode layer.

4. The fuel cell module of claim 2, wherein the third and fourth faces have a stepped structure.

5. The fuel cell module of claim 3, wherein the third and fourth faces have a stepped structure.

6. The fuel cell module of claim 2, wherein the third and fourth faces have curved surfaces.

7. The fuel cell module of claim 3, wherein the third and fourth faces have curved surfaces.

8. The fuel cell module of claim 2, wherein the third and fourth faces have inclined flat surfaces.

9. The fuel cell module of claim 3, wherein the third and fourth faces have inclined flat surfaces.

* * * * *